(12) United States Patent
Brockman et al.

(10) Patent No.: US 6,604,787 B1
(45) Date of Patent: Aug. 12, 2003

(54) MOTOR VEHICLE SEAT

(75) Inventors: Jörg Brockman, Stadthagen (DE); Thomas Mönnich, Obernkirchen (DE); Ralf Perner, Aken (DE); Thomas Schneider, Bückeburg (DE); Katrin Volmar, Lauenau (DE)

(73) Assignee: Faurecia Autositze GmbH & Co. KG (DE)

( * ) Notice: Subject to any disclaimer, the term of this patent is extended or adjusted under 35 U.S.C. 154(b) by 0 days.

(21) Appl. No.: 09/403,975

(22) PCT Filed: Dec. 30, 1998

(86) PCT No.: PCT/EP98/08504

§ 371 (c)(1),
(2), (4) Date: Oct. 29, 1999

(87) PCT Pub. No.: WO99/54162

PCT Pub. Date: Oct. 28, 1999

(30) Foreign Application Priority Data

Apr. 20, 1998 (DE) .......................... 198 17 503

(51) Int. Cl.⁷ .................................. B60N 2/42
(52) U.S. Cl. ................................. 297/216.13
(58) Field of Search ............... 297/216.1, 452.18, 297/216.13, 216.14, 284.1, 284.2, 284.3, 284.4, 452.19, 452.2, 452.4

(56) References Cited

U.S. PATENT DOCUMENTS 4,003,534 A * 1/1977 Kenigsberg et al.
4,076,306 A * 2/1978 Satzinger
4,124,252 A * 11/1978 Safir
4,192,545 A   3/1980 Higuchi et al.
4,309,058 A * 1/1982 Barley
4,512,604 A * 4/1985 Maeda et al.
4,585,272 A * 4/1986 Ballarini
4,630,865 A * 12/1986 Ahs
4,916,765 A * 4/1990 Castronovo, Jr.
5,501,509 A   3/1996 Urrutia
5,671,976 A * 9/1997 Fredrick
5,681,081 A * 10/1997 Lindner et al.
5,685,606 A * 11/1997 Lance
5,938,284 A * 8/1999 Coffield
6,027,171 A * 2/2000 Partington et al.
6,099,075 A * 8/2000 Watkins
6,152,526 A * 11/2000 Persson et al.

FOREIGN PATENT DOCUMENTS

| DE | 4209391 | 10/1992 |
|----|---------|---------|
| DE | 4213917 | 11/1992 |
| DE | 19603946 | 8/1997 |
| GB | 2246699 | 2/1992 |

* cited by examiner

*Primary Examiner*—Milton Nelson, Jr.
(74) *Attorney, Agent, or Firm*—Connolly Bove Lodge & Hutz LLP

(57) ABSTRACT

A motor vehicle seat comprises an underlying framework and reinforcement or stiffening elements which are positioned in adjustable manner relative to the underlying framework to control the firmness of the seat framework in accordance with the user's characteristics and driving conditions.

24 Claims, 3 Drawing Sheets

MOTOR VEHICLE SEAT

BACKGROUND OF THE INVENTION

The invention relates to a motor vehicle seat with a seat frame.

Known motor vehicle seats are designed, in terms of their firmness, in accordance with the automobile industry's testing conditions, for a dummy that is intended to be representative of 95% of the actual users. In the process, if possible, design takes several driving and accident situations into account. In situations that deviate from design conditions, the seat may be designed so as to be too rigid, with the result that in the event of a crash, the user is exposed to accelerations that are too great. If, on the other hand, the motor vehicle seat is designed so as to be too soft, when conditions deviate from the conditions of the design, the danger of injury for the user as a result of insufficient holding strength in the construction of the seat becomes increased.

SUMMARY OF THE INVENTION

Based on the state of the art as described above, it is an objective of the present invention to control the firmness or rigidity of seat structures in the finished seat.

In the case of the proposed motor vehicle seat according to this invention, the structure of the seat, or a portion thereof, is adjusted, in terms of its firmness, to the characteristics of an individual passenger. Prevailing driving conditions can also be considered.

Thus, a motor vehicle seat according to the present invention comprises an underlying framework including a backrest framework and reinforcement elements which can be shifted with respect to the underlying framework to adjust the firmness of the backrest.

BRIEF DESCRIPTION OF THE DRAWINGS

In what follows, several embodiments of the invention are described in greater detail by reference to the drawings. In the drawings, identical parts are given the same reference symbols which can, if necessary, be distinguished from one another by the addition of prime marks.

DETAILED DESCRIPTION OF THE PREFERRED EMBODIMENTS

In all the following embodiments, the motor vehicle seat has an underlying framework 1 that comprises a backrest framework 1a and a seat framework 1e. The various embodiments are distinguished by the nature and attachment of the reinforcement or stiffening elements which may be attached to the backrest framework 1a.

Figure 1:
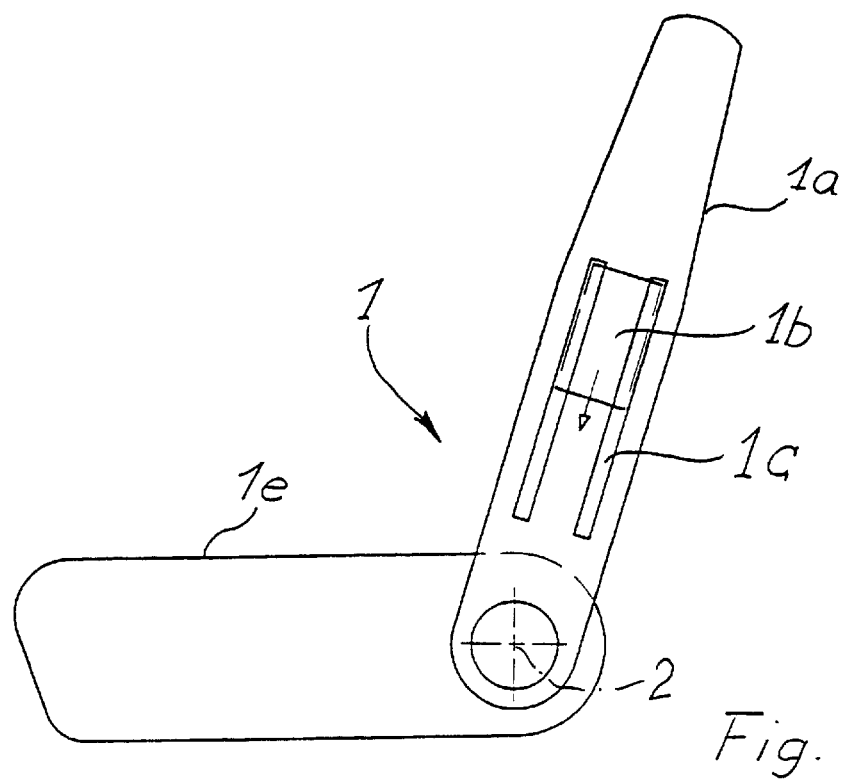
FIG. 1 shows the side view of a schematically represented motor vehicle seat with a plate-like reinforcement or stiffening element that imparts rigidity to the backrest, given a rather soft setting of the backrest structure.
Figure 2:
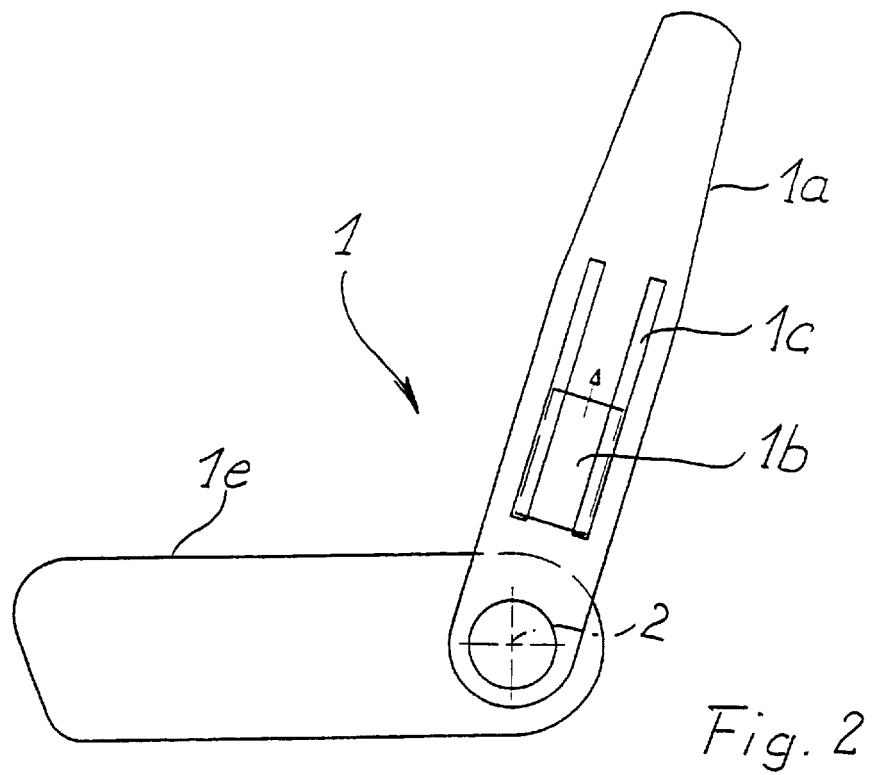
FIG. 2 shows the motor vehicle seat according to FIG. 1, with a more rigid setting.

In the case of the embodiment shown in FIGS. 1 and 2, a plate-shaped reinforcement or stiffening element that imports rigidity, 1b, is provided, whose distance from the axis of inclination 2 may be shifted. The plate-shaped reinforcement element or stiffening element 1b is moved between guide tracks 1c that are parallel to one another and firmly connected to the backrest framework 1a, or are embodied with it so as to form a single piece.

In FIG. 1, the plate-shaped reinforcement element 1b is moved upwardly in such a way that it is positioned at the greatest distance from the axis of inclination 2. In this upwardly shifted position of the reinforcement element 1b, the rigidity of the backrest framework 1a in the area that is adjacent to the axis of inclination 2 will be less than in the case of the arrangement shown in FIG. 2, where the reinforcement element is moved downwardly. Given the position of the reinforcement element 1b that is depicted in FIG. 2, the backrest framework 1a adjacent to the axis of inclination 2 has increased firmness and rigidity.

Figure 3:
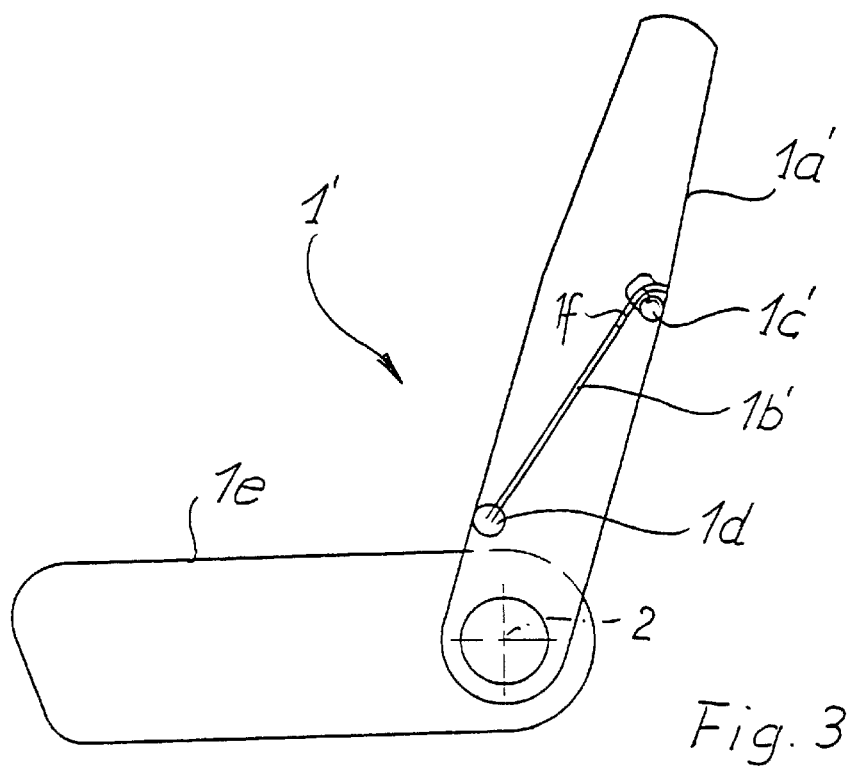
FIG. 3 shows the side view of an alternative embodiment with a reinforcement or stiffening element having, at one end, a catch fastening device, in a rather rigid adjustment of the backrest structure.
Figure 4:
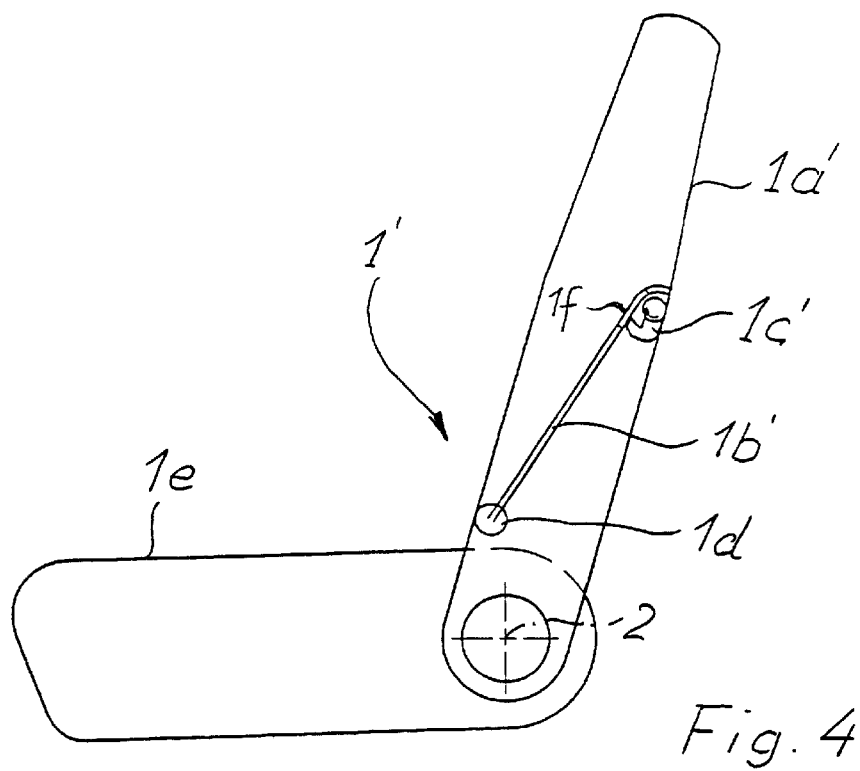
FIG. 4 shows the motor vehicle seat according to FIG. 3, adjusted for a softer setting.

In the case of the embodiment that is depicted in FIGS. 3 and 4, the reinforcement or stiffening element 1b' is embodied as a draw rod or a tension band.

The reinforcement element 1b' is attached, at its lower end, to backrest framework 1a' by means of an attachment element 1d, which is not depicted in greater detail. At the upper end of the reinforcement element 1b' which is embodied as a draw rod, provision is made for a tension element 1c' which is embodied as a latch that either passes through a recess if and holds the reinforcement element 1b' taut, or else is pivoted out of the recess 1f and therefore does not connect the upper end of the reinforcement element 1b' firmly with the backrest framework 1a'.

In a taut state as shown in FIG. 3, the structure of the backrest framework 1a' has a higher degree of rigidity than in a relaxed state as shown in FIG. 4.

Figure 5:
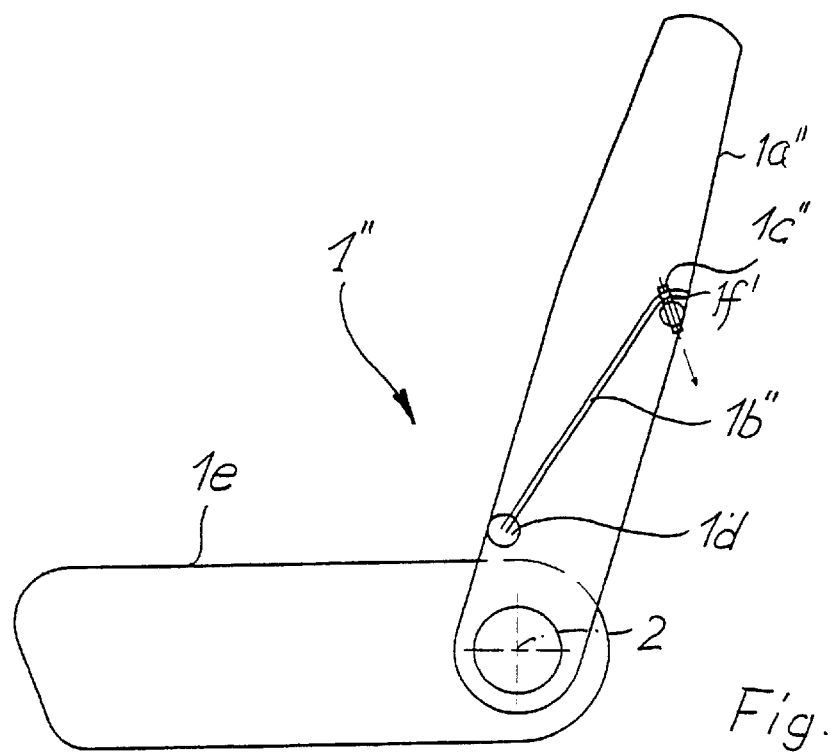
FIG. 5 shows an embodiment of the motor vehicle seat, with a more rigid setting of the backrest structure, that corresponds, substantially, to FIG. 3, with a bolt lock of the reinforcement element that exerts tractile force.
Figure 6:
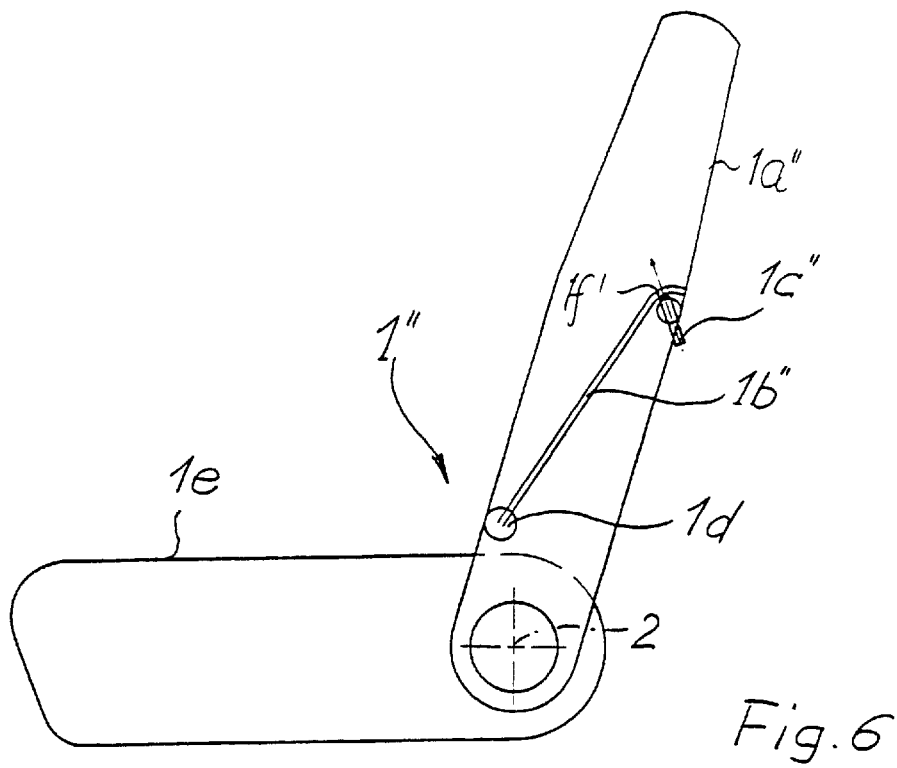
FIG. 6 shows the motor vehicle seat according to FIG. 5, with a softer setting.

In the case of the embodiment according to FIGS. 5 and 6, once again, the reinforcement or stiffening element 1" is embodied as a tension band or a draw rod. The attachment at the lower end corresponds to that of FIGS. 3 and 4. The solid connection of the upper end of the reinforcement element 1" is accomplished in this embodiment by means of a bolt 1c" which, in a taut position, obliquely passes through a recess 1f' and in a relaxed position, is withdrawn from the recess 1f.'In a taut position as shown in FIG. 5, the structure of the backrest framework 1a" has a greater rigidity and firmness than in a relaxed position as shown in FIG. 6.

The repositioning of the reinforcement or stiffening elements can occur both in accordance with the user's characteristics, such as, for example, indications of height, weight, muscular development, etc., as well as in accordance with characteristics of driving conditions, for example, as a function of driving speed.

The user's characteristics can, for example, be stored on a data storage medium with which the repositioning propulsion systems for the reinforcement or stiffening elements are controlled in such a way that the most favorable position is achieved, in each case. It is also possible to detect the user's characteristics by means of sensors, and to utilize the characteristics determined in this manner to effect the adjustment.

In addition, characteristic values of the driving conditions, such as, for example, certain conditions of acceleration, can be determined by means of sensors, and then used for controlling the reinforcement elements. The driving speed can be derived from the speedometer, for example.

What is claimed is:

1. A motor vehicle seat comprising an underlying backrest framework with a plate element slidably connected to the framework and which can be vertically positioned a distance from an axis of inclination along the backrest framework to adjust the rigidity of the framework.

2. The motor vehicle seat according to claim 1, wherein said plate element is adjustable according to characteristics of a user of said seat.

3. The motor vehicle seat according to claim 1, wherein said plate element is secured by said underlying framework.

4. The motor vehicle seat according to claim 1, wherein said plate element is adjustable as a function of a weight on the seat.

5. The motor vehicle seat according to claim 1, wherein said plate element is adjustable in accordance with driving conditions.

6. A motor vehicle seat comprising an underlying backrest framework with a self-contained, vertical reinforcement element with one end fixedly attached to an attachment element adjacent an axis of inclination, and an opposite end with a tension element capable of engaging the backrest framework a distance from the axis of inclination.

7. The motor vehicle seat according to claim 6, wherein said reinforcement element is secured by said underlying framework.

8. The motor vehicle seat according to claim 6, wherein said reinforcement element is adjustable as a function of the weight on the seat.

9. The motor vehicle seat according to claim 6, wherein the position of the reinforcement element is shifted by a motor.

10. The motor vehicle seat according to claim 6, wherein said reinforcement element is adjustable according to characteristics of a user of said seat.

11. The motor vehicle seat according to claim 10, wherein said user characteristics are stored on a data storage medium and used to control the positioning of said reinforcement element.

12. The motor vehicle seat according to claim 11, further including sensor means for detecting said user characteristics.

13. The motor vehicle seat according to claim 6, wherein said reinforcement element is adjustable in accordance with the driving conditions.

14. The motor vehicle seat according to claim 13, further including sensor means for detecting said driving conditions.

15. The motor vehicle seat according to claim 6, wherein said reinforcement element is a traction element.

16. The motor vehicle seat according to claim 15, wherein said traction element is a draw rod.

17. The motor vehicle seat according to claim 15, wherein said traction element is a tension band.

18. The motor vehicle seat according to claim 15, wherein the tractile force of said traction element is adjustable.

19. The motor vehicle seat according to claim 15, wherein said reinforcement element is adjustable according to characteristics of a user of said seat.

20. The motor vehicle seat according to claim 15, wherein said reinforcement element is secured by said underlying framework.

21. The motor vehicle seat according to claim 15, wherein said reinforcement element is adjustable as a function of a weight on the seat.

22. The motor vehicle seat according to claim 15, wherein said reinforcement element is adjustable in accordance with the driving conditions.

23. A motor vehicle seat comprising an underlying backrest framework with a self-contained reinforcement element positionable within said backrest to adjust the rigidity of the framework, wherein said reinforcement element is adjustable according to the characteristics of a seat user, said characteristics stored on a data storage medium and used to control the positioning of said reinforcing element.

24. A motor vehicle seat comprising an underlying backrest framework with a self-contained reinforcement element positionable within said backrest to adjust the rigidity of the framework, wherein said reinforcement element is adjustable according to driving conditions, which are detected by a sensor.

* * * * *